March 2, 1965     W. KOHRING     3,171,564
SUPPORT MEANS
Filed Feb. 5, 1963
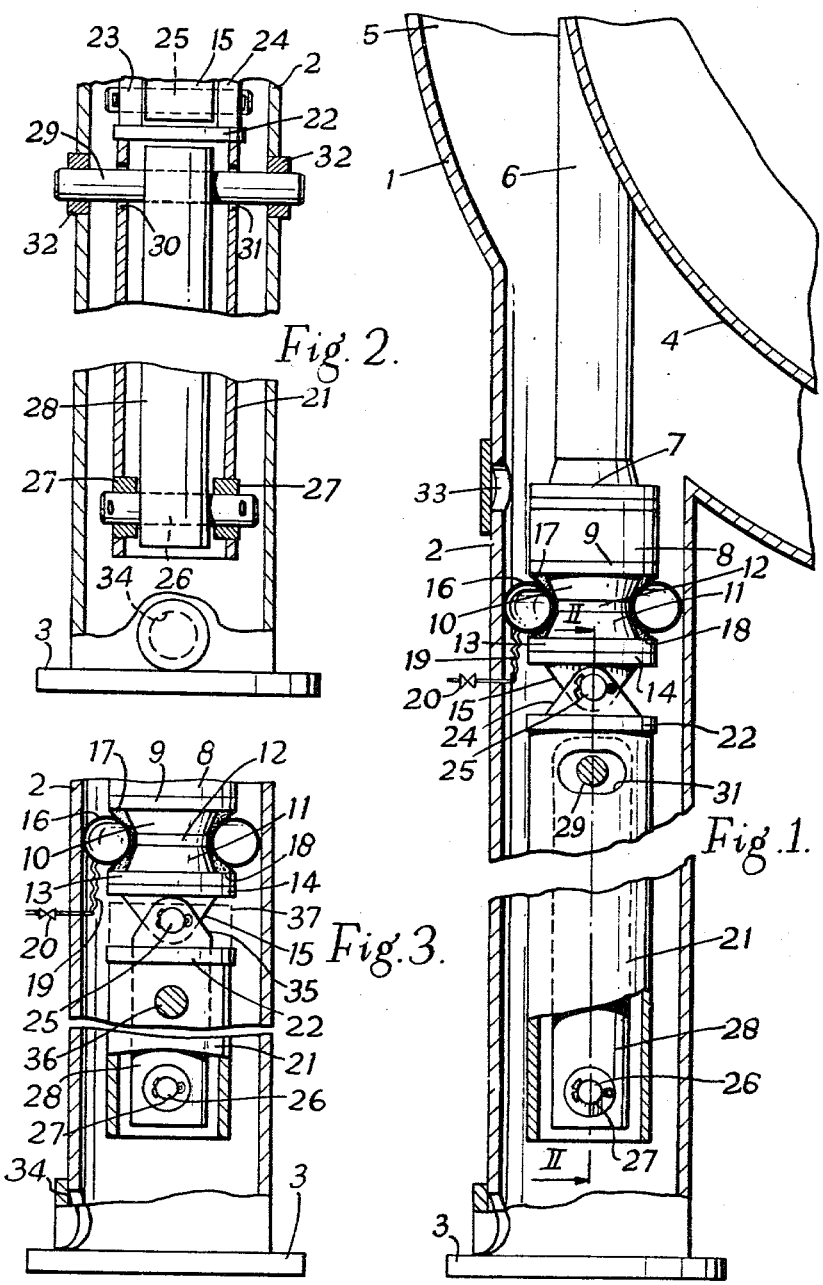

United States Patent Office 3,171,564
Patented Mar. 2, 1965

3,171,564
SUPPORT MEANS
Walter Kohring, Rawreth, near Wickford, England, assignor to The Motherwell Bridge and Engineering Company Limited, London, England, a company of Great Britain
Filed Feb. 5, 1963, Ser. No. 256,802
Claims priority, application Great Britain, Sept. 17, 1962, 35,336/62
9 Claims. (Cl. 220—15)

This invention relates to support means and is particularly although not exclusively applicable to double walled tanks for the storage of liquefied, normally gaseous, materials.

Such tanks may comprise a spherical inner storage vessel within a spherical outer shell the space between the vessel and the shell being filled with heat insulating material. It is known to support the outer shell on a plurality of hollow legs and to support the inner storage vessel on members extending downwardly into the hollow legs of the outer shell.

When storing liquefied normally gaseous materials in a storage vessel provision must be made for expansion and contraction of the latter and in a large vessel for example 60 to 100 feet in diameter allowance must be made for a radial movement of the vessel wall of about 2 inches.

It has been proposed to support the members on piers extending within the hollow legs of the shell and to permit sliding engagement in a horizontal direction to occur between the lower ends of the members and the upper ends of the piers. A further proposal is to extend the members downwardly to the lower ends of the hollow legs and radially displace the lower ends of the members and hold them in their displaced position so as to prestress the members laterally in such direction that subsequent movement of the vessel tends to relieve this stress.

In the first of these arrangement unpredictable distortion of the member tends to occur and in both arrangements an undesirable bending stress is introduced at the juncture of the member and the vessel.

It is an object of the present invention to provide improved support means particularly although not exclusively suitable for supporting the inner storage vessel of a double walled storage tank for liquefied normally gaseous material which does not rely upon relatively sliding surfaces or upon the pre-stressing and therefore deliberate physical distortion of the support means and which minimises undesired stresses both in the support means and the vessel.

A further object is to minimise any tendency of the vessel to vertical displacement apart from movement as a result of expansion and contraction.

According to the present invention there is provided support means for an object liable to horizontal movement comprising a rigid member extending outwardly from the object a first support link pivoted to the member and extending vertically or nearly vertically away from its pivot, a second support link pivoted at one end to the end of the first support link remote from the member and extending vertically or nearly vertically from said end towards the member and being pivoted at its other end to a rigid support the axes of all the pivots being parallel with one another and extending in such direction that the links may pivot to accommodate said horizontal movement.

Preferably the object to be supported comprises the spherical inner storage vessel of a double walled tank the outer shell of which is supported on hollow legs and the rigid member comprises an arm secured to the vessel and extending downwardly into one of the legs the first and second links being accommodated within the leg and the rigid support being constituted by the leg. The first support link may comprise a tube extending downwardly from the arm the second support link extending upwardly within the tube and being pivoted to the support leg about a pivot bar extending with clearance through opposed slots formed in the tube.

Alternatively the first support link may extend downwardly from the arm the second support link comprising a tube extending upwardly around the first support link and being pivoted to the support leg by trunnions.

One embodiment of the invention will now be described by way of example with reference to the accompanying drawing in which:

FIG. 1 shows a fragmentary view partly in section of a double walled spherical storage tank for liquefied, normally gaseous, material, FIG. 2 is a part section on the line II—II of FIG. 1, and FIG. 3 is a view similar to part of FIG. 1 of a modification.

Referring to FIGS. 1 and 2 of the drawing, a double walled storage tank for liquefied, normally gaseous material comprises an outer spherical shell 1 supported on a plurality of symmetrically disposed hollow legs one of which is shown at 2 the lower end of which is closed by a plate 3. The tank also comprises an inner spherical storage vessel 4 which in known manner is of smaller diameter than the shell 1 and is disposed concentrically therein, a space 5 between the vessel and the shell being filled with heat insulating material (not shown). The vessel 4 is provided with a plurality of downwardly extending support arms respectively registering with the hollow legs of the shell 1 and one of which is shown at 6. The arm 6 extends into the upper part of the leg 2 and terminates in a flange 7 bolted by bolts of a low heat transfer material such as stainless steel to a cylindrical block 8 of a material constituting a heat barrier such as that sold under the registered trade-mark "Teflon." The lower end of the block 8 is secured to a flange 9 of a tapered element 10 separated from a similar oppositely disposed tapered element 11 by a short length of tube 12. At its lower end the element 11 is welded to a flange 13 bolted to a plate 14 carrying a downwardly extending support 15.

A flexible hollow annular fluid insulation retainer 16 is engaged between the wall of the leg 2 and the tapered elements 10 and 11 with the intermediary of scuffing rings 17 and 18. The retainer 16 may be supplied in known manner with the selected fluid such as nitrogen through a flexible pipe 19 controlled by a valve 20. It will here be appreciated that the retainer 16 serves to hold in place insulation material within the space 5 while at the same time accommodating horizontal movement of the arm 6 such as will be described later.

A first support link comprises a tube 21 closed at its upper end by a plate 22 carrying a pair of upwardly extending members 23 and 24 pivoted to the support 15 by a bar 25. Towards its lower end the tube 21 is pivoted by a bar 26 journalled in bearings 27 to the lower end of a second support link comprising a rod 28 which extends upwardly through the tube 21 to terminate short of the plate 22. Towards its upper end the rod 28 is pivoted on a bar 29 extending with clearance through registering slots 30 and 31 in the tube 21 and journalled in bearings 32 carried by the leg 2.

In assembling the unit described above the links 21 and 28 and those elements up to and including the block 8 are pre-assembled, located in the leg 2 and secured in position by insertion of the bar 29 prior to assembly of the upper half of the shell 1. The vessel 4 is then lowered into position and the flanges 7 at the lower ends of its arms such as 6 bolted to their associated blocks such as 8 access for this purpose being gained through handholes one of which is shown at 33 in the wall of the leg 2. Further handholes such as 34 are provided at the lower end of the leg 2 to permit access to be gained to the interior thereof.

It will be appreciated that the bars 25, 26 and 29 all extend parallel with one another tangentially of the vessel 4 and as shown in FIGS. 1 and 2 their axes all lie in the same vertical plane. Should the vessel 4 expand or contract the arm 6 will move horizontally radially of the vessel, i.e. to the left or right as viewed in FIG. 1. Such movement will displace the bar 25 radially with respect to the line joining the bars 26 and 29 and cause both links to pivot and adopt a position in which the angle between them is minimised. For example if the bar 25 moves to the right as shown in FIG. 1 the upper end of the link 21 is carried with it and the continued downward thrust of the arm 6 causes the lower end of the link 21 and therefore the bar 26 to be swung to the left as viewed in FIG. 1 causing the link 28 to pivot about the bar 29; a stable position being reached when the angle between the longitudinal axes of the links is a minimum. The slots 30 and 31 permit the free movement of the link 21 for a limited lateral displacement of the arm 6.

It will be appreciated that the mechanism can be arranged for the bars 25, 26 and 29 to be vertically in line when the vessel 4 adopts any predetermined position within its likely range of horizontal movement.

Furthermore since it is envisaged that a plurality of such linkages shall be provided at positions around the vessel 4 and that the links shall be as long as possible to minimise their angular displacement and the thrust imparted by the arms such as 6 is always vertically (or very nearly vertically) downwards, each linkage system is capable of adopting a stable displaced position without relying upon engagement of the lower part of the link 21 with the leg 2 or the bar 29 with the ends of the slots 30 and 31. However the possibility of such engagement provides a safety margin should the lateral displacement of the arm 6 exceed estimated limits.

In addition it will be apparent that because the movement of the arms 6 is substantially horizontal and the thrust in the arms is vertical or very nearly vertical the arms are not subjected to any appreciable lateral stress so that there is substantially no tendency for a bending movement to occur at the juncture of the arms and the vessel.

FIG. 3 of the drawing shows a modified arrangement in which the rod 28 constitutes the first support link and is bifurcated at its upper end 35 to engage over the support 15 and be pivoted thereto by the bar 25. The tube 21 then constitutes the second support link and towards its upper end is provided with a pair of trunnions one of which is shown at 36 journalled in bearings such as 32 (FIG. 2) carried by the leg 2. The arrangement of FIG. 3 operates as described above in respect of FIGS. 1 and 2 but it will be appreciated that with the modified construction the bar 25 and the trunnions such as 36 can readily be arranged to be co-axial. This can be achieved for example by extending the tube 21 upwardly as shown by the chain lines 37. Such an arrangement provides the optimum condition in which the first and second links are both of identical length and in this case lateral movement of the arm 6 is truly horizontal and accompanied by no vertical displacement.

Although as described above in connection with FIGS. 1 and 2 the linkage supports a vessel 4 mounted above it, it will be appreciated that the vessel may be hung from a similar linkage mounted above it. In addition although described specifically in connection with double walled tanks for the storage of liquefied, normally gaseous, material it will be appreciated that the support means according to the invention may be utilized to support any other object subject to limited horizontal movement.

I claim:

1. Support means for an object liable to horizontal movement comprising a rigid member extending outwardly from the object a first support link pivoted to the member and extending substantially vertically away from its pivot, a second support link pivoted at one end to the end of the first support link remote from the member and extending substantially vertically from said end towards the member and being pivoted at its other end to a rigid support the axes of all the pivots being parallel with one another and extending in such direction that the links may pivot to accommodate said horizontal movement.

2. Support means according to claim 1 in which the object to be supported comprises the spherical inner storage vessel of a double walled tank having an outer shell supported on hollow legs and the rigid member comprises an arm secured to the vessel and extending downwardly into one of the legs the first and second links being accommodated within the leg and the rigid support being constituted by the leg.

3. A double walled tank comprising an inner storage vessel and an outer shell, downwardly extending hollow legs on the outer shell, corresponding rigid arms extending downwardly from the vessel into the upper parts of associated legs a first tubular support link in each leg pivoted at its upper end to the arm and extending downwardly in the leg, a second support link pivoted at its lower end to the lower end of the tubular support link and extending upwardly therethrough and being pivoted at its upper end to the leg by pivots passing through clearance slots in the first tubular support links, the axes of all the pivots being parallel and extending in such direction that the links may pivot to accommodate horizontal movement of the inner vessel relative to the outer shell.

4. A double walled tank comprising an inner storage vessel and an outer shell downwardly extending hollow legs on the outer shell corresponding rigid arms extending downwardly from the vessel into the upper parts of associated legs a first support link in each leg pivoted at its upper end to the arm and extending downwardly in the leg a second tubular support link pivoted at its lower end to the lower end of the first support link and extending upwardly therearound and being pivoted at its upper end to the leg the axes of all the pivots being parallel and extending in such direction that the links may pivot to accommodate horizontal movement of the inner vessel relative to the outer shell.

5. A tank according to claim 4 in which the pivots at the upper ends of the first and second support links are co-axial.

6. A double walled tank comprising an inner storage vessel and an outer shell, downwardly extending hollow legs on the outer shell, corresponding rigid arms extending downwardly from the vessel into the upper parts of associated legs, an annular flexible insulation retainer engaged between each arm and its associated leg, a first tubular support link in each leg pivoted at its upper end to the arm and extending downwardly in the leg, a second support link pivoted at its lower end to the lower end of the tubular support link and extending upwardly therethrough and being pivoted at its upper end to the leg by pivots passing through clearance slots in the first tubular support links, the axes of all the pivots being parallel and extending in such direction that the links may pivot to accommodate horizontal movement of the inner vessel relative to the outer shell.

7. A tank according to claim 6 in which said retainer is hollow and means are provided to supply the interior of the retainer with a fluid.

8. A double walled tank comprising an inner storage vessel and an outer shell downwardly extending hollow legs on the outer shell corresponding rigid arms extending downwardly from the vessel into the upper parts of associated legs, an annular flexible insulation retainer engaged between each arm and its associated leg, a first support link in each leg pivoted at its upper end to the arm and extending downwardly in the leg a second tubular support link pivoted at its lower end to the lower end of the first support link and extending upwardly therearound and being pivoted at its upper end to the leg the axes of all the pivots being parallel and extending in such direction that the links may pivot to accommodate horizontal movement of the inner vessel relative to the outer shell.

9. Support means according to claim 8 in which said retainer is hollow and means are provided to supply the interior of the retainer with a fluid.

References Cited by the Examiner
UNITED STATES PATENTS

| | | | |
|---|---|---|---|
| 2,706,575 | 4/55 | Scherr | 220—15 |
| 2,959,318 | 11/60 | Clark et al. | 220—15 |

THERON E. CONDON, *Primary Examiner.*